United States Patent [19]

Flaten

[11] Patent Number: 4,509,267
[45] Date of Patent: Apr. 9, 1985

[54] PRESET INDICATOR ASSEMBLY

[75] Inventor: James F. Flaten, Burnsville, Minn.

[73] Assignee: Tobin-Arp Manufacturing Company, Eden Prairie, Minn.

[21] Appl. No.: 472,613

[22] Filed: Mar. 7, 1983

[51] Int. Cl.$^3$ ............................................. G01B 5/12
[52] U.S. Cl. ................. 33/185 R; 33/178 R; 33/147 K
[58] Field of Search ............ 33/178 R, 185 R, 147 K, 33/169 R, 143 H

[56] References Cited

U.S. PATENT DOCUMENTS

| | | | |
|---|---|---|---|
| 1,416,810 | 5/1922 | Foster | 33/185 P |
| 1,972,124 | 9/1934 | Aldeborgh et al. | 33/178 R |
| 2,441,716 | 5/1948 | Mitchell | 33/185 R |
| 2,606,370 | 8/1952 | Hicks | 33/164 |
| 2,893,128 | 7/1959 | Carlson et al. | 33/143 H |
| 3,302,295 | 2/1967 | White | 33/147 |
| 3,352,021 | 11/1967 | Leach et al. | 33/178 R X |
| 4,045,877 | 9/1977 | Rutter | 33/178 |
| 4,170,831 | 10/1979 | Olasz | 33/178 |
| 4,211,014 | 7/1980 | Koltgen | 33/178 |
| 4,265,026 | 5/1981 | Meyer | 33/178 |
| 4,338,726 | 7/1982 | Swailes | 33/178 |

FOREIGN PATENT DOCUMENTS 385166 12/1923 Fed. Rep. of Germany .... 33/178 R

Primary Examiner—Harry N. Haroian
Attorney, Agent, or Firm—Kinney & Lange

[57] ABSTRACT

A preset indicator assembly has a dial indicator and a radially extending feeler post which can be preset to a desired diameter indication and used in a machine that is used for boring the bearing housings of an engine for quickly and accurately locating the center line of the bores prior to reboring the housings. The indicator is used in a method that provides setting the indicator very quickly, and also very quickly using the indicator for proper location of a head or block that is being worked on for reboring bearing bores. The bores may be either cam shaft bores or main bearing bores for the crank shaft of an engine.

3 Claims, 5 Drawing Figures

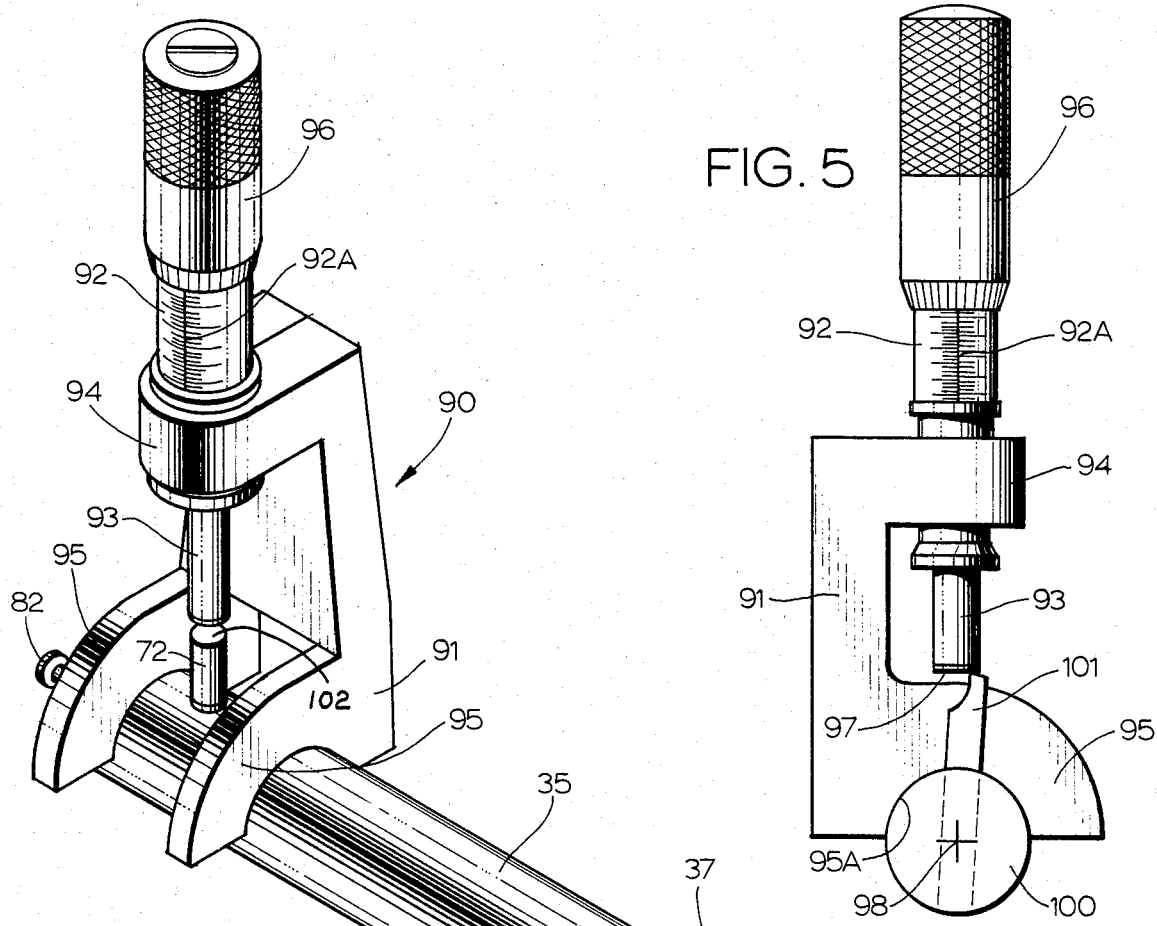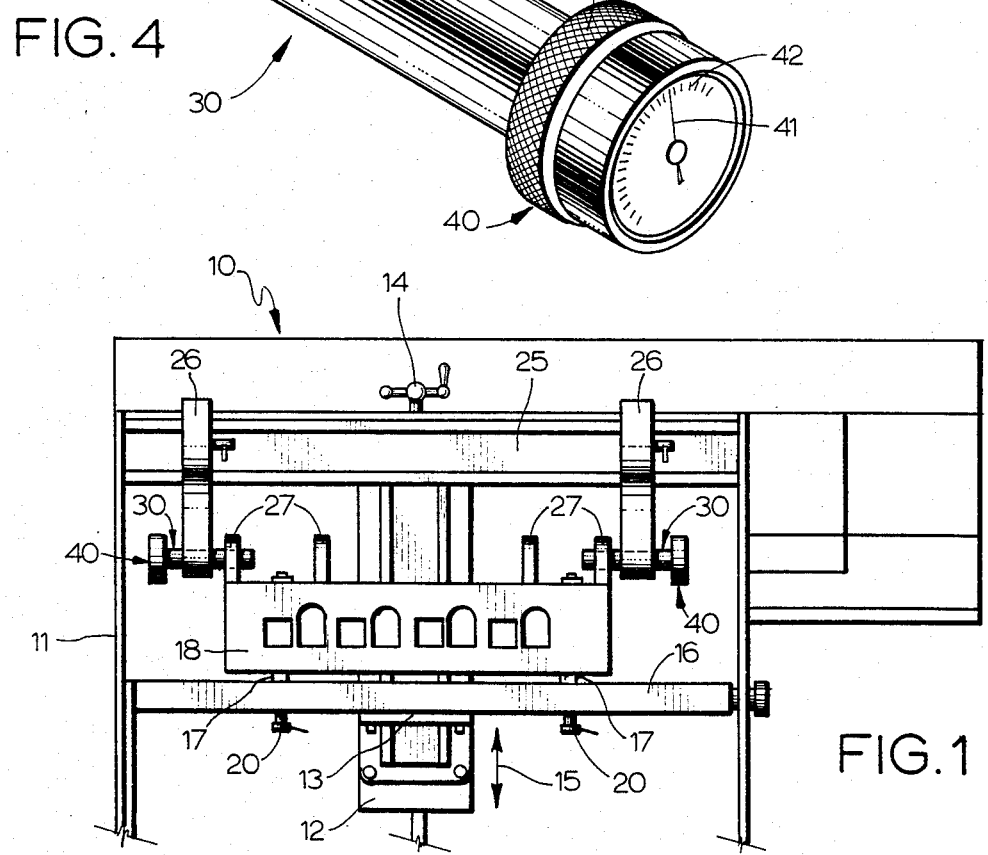

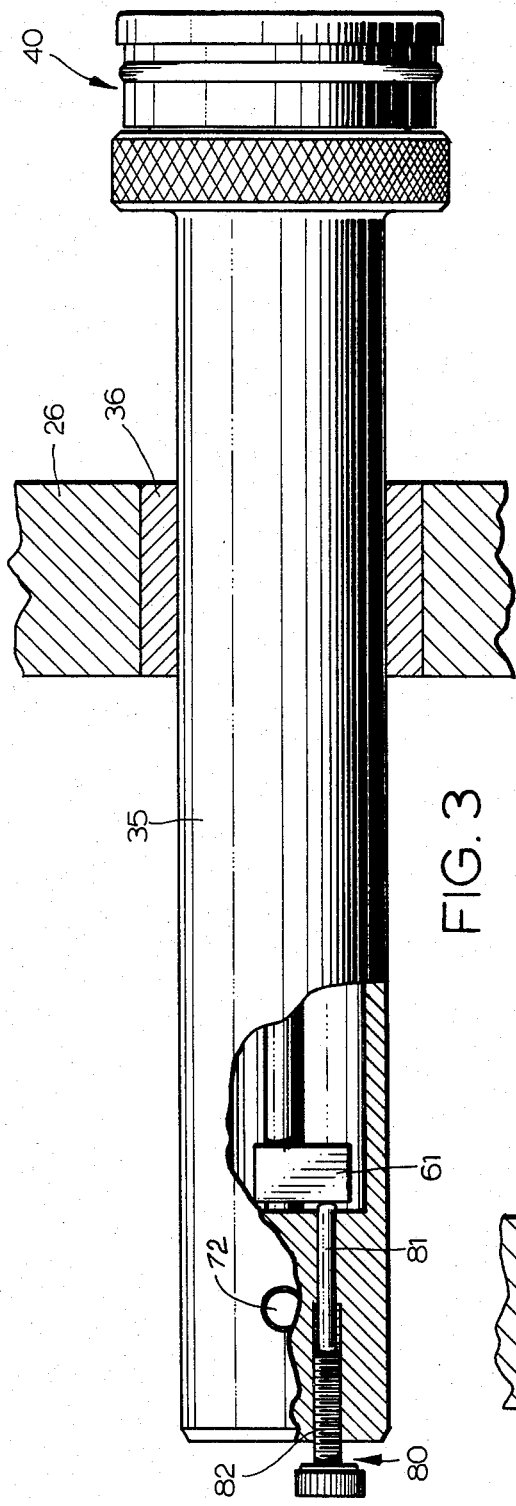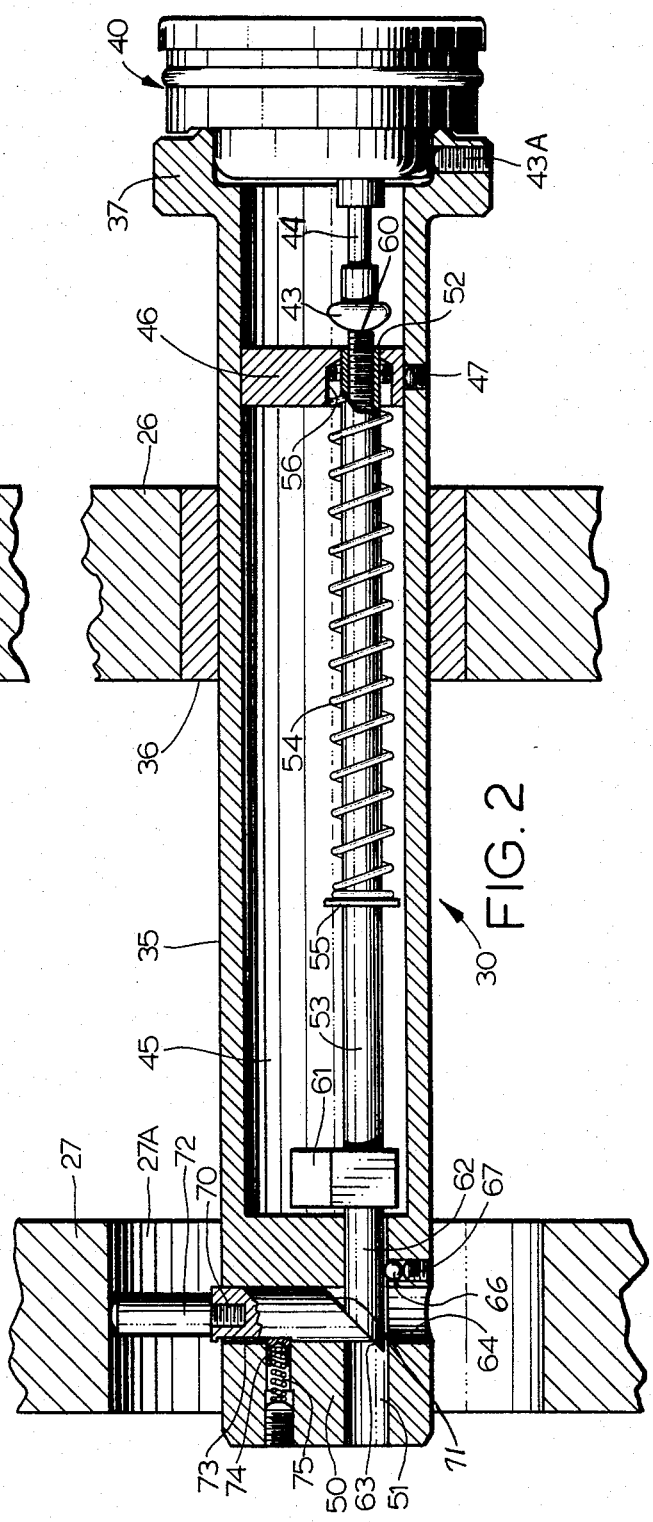

PRESET INDICATOR ASSEMBLY

BACKGROUND OF THE INVENTION

1. Field of the Invention

The present invention relates to indicators used for centering parts, and in particular, for locating and centering the bores on parts in relation to an axis that is to be used for boring.

2. Description of the Prior Art

In the prior art there are a wide number of dial indicators presently on the market, and also various micrometers which provide indications from radially extending buttons which are linked to a dial indicator in a desired way.

Dial indicators are well known measurement instruments, which have a dial face on which indications of movement of an indicator button is displayed by movement of a needle. Usually the dial face is capable of being set to a zero reading by moving the dial face without adjusting the needle. The needle responds to movement of the indicator button.

A form of prior art retractable dial bore gauge is shown in U.S. Pat. No. 4,045,877. This device has a bell crank operated external gauge, operating through a link to engage the indicator button of a dial indicator that is remote from its actuator. The linkage has many moving parts, which is a drawback, and in particular where there are a number of pivots and bearings, wear can easily become a problem.

Additionally, an adjustable bore gauge is shown in U.S. Pat. No. 3,302,295. The bore gauge in U.S. Pat. No. 3,302,295 has a range extension button that extends radially and permits the gauge to be used in different bore sizes, and it includes a remote dial indicator for indicating the bore size.

U.S. Pat. No. 2,606,370 shows a conventional inside micrometer which has a radially extending pin, but which is mechanically actuated with external numerals that indicate the size of the bore in which the remote feeler is placed.

A line bore gauge is shown in U.S. Pat. No. 4,338,726, and this requires a set up utilizing bearings mounted in the crank shaft bearing seats, and includes a dial indicator slidably mounted on a shaft passing through the bores to be measured. The dial indicator slides along the shaft and engages the inside surfaces of the bores.

U.S. Pat. No. 4,265,026 also shows an internal measuring device utilizing a dial indicator, and a remote pin operating through a linkage and inclined plane actuator. There is no mechanism to permit presetting the device in the present invention, and there is no teaching of utilization of the indicator in combination with an external micrometer as shown herein.

U.S. Pat. No. 4,211,014 shows a device for inspecting bores as well, as does U.S. Pat. No. 4,170,831. These devices do include indicator dials, and linkages for connecting the dials to remote feelers or indicator pins, and generally represent the state of the art.

SUMMARY OF THE INVENTION

The present invention relates to a preset indicator assembly that can be used for indicating bores of a part to be reworked on a line boring machine. The indicator may be preset to the bore size, and used in conjunction with boring bar supports of the machine so that the part that is to be bored will be easily located in relation to the axis of the rotation of the boring bar.

The remote indicator button of the present device is easily adjusted for different size ranges, and the entire linkage from the remote indicator button to the standard dial indicator is accurate and easily adjusted for various ranges in settings.

The indicator is utilized in combination with a micrometer fixture which fits onto the housing for the dial indicator assembly of the present invention and is used for presetting the indicator pin of the present assembly to the radius.

BRIEF DESCRIPTION OF THE DRAWINGS

FIG. 1 is a part schematic view of a typical line boring machine having the boring bar supports and showing schematically the technique for aligning a member that is to have the bearing seats rebored;

FIG. 2 is a sectional view through an indicator assembly made according to the present invention;

FIG. 3 is a top view of the device of FIG. 2 with parts in section and parts broken away;

FIG. 4 is a perspective view of the device of the present invention showing a micrometer fixture for setting the desired radius on the indicator of the present invention; and FIG. 5 is an end view of the micrometer fixture shown in FIG. 4 in position on a boring bar and showing the fixture being used for setting the boring tool to the proper diameter.

DETAILED DESCRIPTION OF THE PREFERRED EMBODIMENT

A boring machine assembly indicated generally at 10 is shown only schematically, and is a type of machine illustrated comprising the Model CB24000 Cam Boring Machine manufactured by the Tobin-Arp Manufacturing Company, 15200 West 78th Street, Eden Prairie, Minn. 55344. Many boring machines for engine block crank shaft bearings have been advanced, and such machine have the features of a machine used for boring the cam bearings in a head. For example, U.S. Pat. No. 2,250,788 shows a machine for boring engine bearings which includes a boring bar supported in overhead housings, and it is this type of machine which can be utilized with the present invention. Also, U.S. Pat. No. 4,213,721 shows an align boring machine that provides for adjustment of the boring bar hangers and movement of the engine part that has the bearing seats that are to be bored in both horizontal and vertical directions for alignment.

These prior art machines mentioned are merely by way of background to provide more details on the type of machine with which the present indicator assembly and method is utilized. The machine 10 includes a frame 11 which has side plates, and a center column 12 that mounts a support table 13 that is vertically adjustable by operation of a screw crank 14 in up and down directions indicated by the double arrow 15.

The table 13 includes cross supports 16 that are provided with suitable parallel bars 17, as shown, so that an engine head 18 can be clamped with suitable screws to the table. The engine head 18 can be moved horizontally, that is in the plane of the table, by loosening the holding screws and sliding or tapping the block slightly in directions along the table, either right or left, or fore and aft.

The boring machine 10 includes a main support cross member indicated at 25 on which boring bar hangers 26 are adjustably mounted for lateral movement transversely above the table and head which is to be worked upon. The boring bar hangers 26 are made so that when a head 18 is in position, and the cam shaft bearing housings 27 are positioned between the hangers 26,26. The hangers have bores therein which will support a boring bar and cutting tool in a conventional manner that is fed and driven in a suitable manner as shown in the prior art described. A suitable cutting tool is moved into the bores within the housings 27 and the cutting tool will then bore or cut out the proper size opening and the bores in the housings 27 will be in perfect alignment with the same central axis. This axis is defined by the axis of the bushings or bearings in the hangers 26.

An indicator assembly of the present invention, indicated at 30, is shown in each of the hangers 26, and as will be explained the indicator assemblies are used for centering the head 18 so that the center lines of the existing bores are easily made substantially concentric with the bores in the bearing hangers.

Indicator assemblies of the present invention are made so that they may be preset to the bore size in housings 27 on the head 18. This permits faster set ups, and thus increases production on reboring cam shaft bearings.

The indicator assembly of the present invention includes a cylindrical support sleeve or housing indicated generally at 35, and as shown this cylindrical support sleeve is selected to be the same diameter as the boring bar that is used in the boring machine so that the sleeve will fit into a bushing 36 in the bores in the hangers 26.

The cylindrical sleeve 35 has a sliding, close fit, so that it can be slid along its longitudinal axis.

A housing 37 is provided at one end of the cylindrical sleeve 35, and this housing is of size to receive a standard dial indicator 40. The dial indicator is of conventional design, as shown in FIG. 4, having a dial indicating needle 41 which indicates relative to a dial face indicated at 42 having marks for each 0.001 inch. The dial indicator housing has an extending actuator shank 44 that has a button 43 at its outer end in the conventional manner. The dial indicator 40 is held in the housing 37 through the use of a set screw 43A that engages the case for the dial indicator and holds it in position.

The cylindrical sleeve 35 has an interior bore injected at 45 therein which extends throughout the length thereof from the housing 37 to the opposite end. A support member 46 is suitably held on the interior of this bore 45 through the use of a set screw 47. The opposite end of the cylindrical sleeve 35 has a solid wall indicated at 50 therein. The wall 50 has a reduced size bore 51 that extends parallel to the longitudinal axis of the sleeve 35, and is offset from the longitudinal axis and the support 46 also has a bore indicated at 52 which is coaxial with the bore 51. An elongated actuator rod assembly 53 is slidably mounted through the bore 52 and is supported in one end portion of the bore 51, as shown. A spring 54 is mounted over the actuator rod 53 and is held from travel relative to the rod with a suitable stop washer 55 at a desired location on the actuator rod, and the spring 54 also extends into a counterbore 56 in the support 46 as shown.

The actuator rod 53 has an internal thread at the end adjacent bore 52 in which an adjustment screw 60 is mounted, and the adjustment screw in turn is aligned with and contacts the actuator end button 43 of the dial indicator assembly 40. Adjustment screw 60 can be adjusted to accommodate different positions of the dial indicative, or to permit use of different types of dial indicators.

The actuator rod 53 has a lug 61 fixedly attached thereto adjacent the wall 50, and the lug 61, as shown as FIGS. 3 and 4, extends laterally from the actuator rod 53 a desired amount and fits within the bore 45. The end portion 62 of the actuator rod 53 is slidably mounted in the bore 51, and the end portion 62 terminates along an inclined plane surface 63 that is inclined at an oblique angle to the axis of the actuator rod as shown. A cross bore 64 is provided in the end wall 50, and the axis of cross bore 64 intersects the longitudinal axis of the sleeve 35 and it also intersects the axis of the bore 51. The end portion 62 protrudes into cross bore 61. Movement of the actuator rod 53, and the end portion 62, in the bores 51 and 52 cause the ramp surface 63 to move transverse to the cross bore 64. As shown, the ramp surface 63 is positioned within the cross bore.

A small ball member indicated at 66 is mounted in a bore in the end wall 50 of the sleeve 35 and a set screw 67 is used for adjusting the ball 66 so that the end portion 62 of the actuator rod 53 is supported on ball 66. This ball is provided to reduce friction between bore 51 and end portion 62 of shaft 53.

A feeler post or button 70 is mounted in the cross bore 64. The post 70 is a cylindrical member having an end actuator surface 71 which defines an inclined plane relative to the axis of the post 70. Surface 71 engages and slides against the surface 63. These surfaces are relatively smooth and are hardened to reduce wear and friction. Movement of the actuator rod 53 along its axis will cause a movement of the feeler post 70 in bore 64. The outer end of post 70 in turn has an internal thread into which an extension indicator post 72 of selected length can be mounted. The extension post 72 has a rounded button end as is normal for indicators or feelers. The extension post 72 can be selected in length for the desired bore size being sensed, and a number of interchangeable extension indicator posts of different lengths are provided for.

The feeler post 70 has a flat surface on one side that is shown to the left in FIG. 2, and indicated at 73. This flat surface aligns with a small plunger 74 that is spring loaded with a spring 75 in a bore so that the plunger bears against the flat surface and retains the feeler post 70 within a desired range of travel determined by the axial length of the flat surface. Note that there are end surfaces at the ends of the flat spot that the plunger 74 will engage to prevent the feeler post 70 from falling out of the bore 64 in either direction.

A stopped position of the indicator rod 53 as urged by spring 54 can be preset through the use of an adjustment screw assembly indicated at 80 in FIG. 3. The adjustment screw assembly includes a screw 82 and a plunger 81 which extends into the bore 45 and aligns with the lug 61 on the actuator rod 53. The screw 82 is threadably mounted in wall 50 of the cylindrical member 35 and its position can be changed by threading it so that it moves the plunger 81 to stop the actuator rod in a desired position. The spring load of spring 54 urges the actuator rod 53 and lug 61 against the plunger 81.

In order to properly set the extension post 72, and thus the dial indicator assembly 40 and in particular the indicator or needle on the dial 42 in relation to a desired size bore that is to be bored out, a micrometer assembly 90 is utilized. This includes a mounting fixture 91 and a standard micrometer handle or tang 92 that includes a threadably movable plunger 93, the position of which is indicated by the markings 92A on the handle. The fixture 91 as shown has a support block 94 for the micrometer handle, and also includes a pair of spaced mounting legs 95 that have part cylindrical surfaces that are outwardly facing and which are of precise size to fit over the outer cylindrical surface of the shank 35, as well as to fit onto a boring bar 100 that is shown in FIG. 5.

As the actuator handle is rotated the plunger 93 will be moved in or out. The readings on the micrometer indicator lines 92A indicate the distance of the end surface 97 of the plunger 93 from the axis of the part cylindrical surfaces on the support legs 95. This center axis is shown at 98 on the boring bar 100 in FIG. 5. In other words, the micrometer assembly is made so that it will indicate the radius of the surface 97 from the axis or center of the cylindrical seating surfaces on the legs 95.

The legs 95 as shown are spaced apart in direction along the longitudinal axis of the cylindrical member 35 (or of the boring bar 100) so that the fixture is very stably supported when the assembly 90 is mounted on the sleeve 35.

In operation, when the cam shaft bores on an engine head 18 are to be rebored, the nominal diameter of the bores in the cam shaft housings 27, for example the diameter of the bore indicated at 27A in FIG. 2, is measured with a conventional inside micrometer. This reading then gives the nominal size, for example two inches or the like. The proper extension post 72 is selected for that particular diameter bore so that when the button end is at the proper setting, the surfaces 71 and 63, and the dial indicator 40 are in usable positions. The extension posts can be changed for different diameters of bores 27A and the post 72 is selected so that the travel of the end member 62 and end surface 63, in relation to the surface 71 is proper.

The setting of the bore size for bore 27A is then made on the micrometer assembly 90 as indicated by lines 92A, so that the radius from the central axis of the support surfaces on the legs 95 up to the end surface 97 of the micrometer plunger 93 is correct. The micrometer assembly 90, including the support fixture 91 is then placed onto the shank 35 as shown in FIG. 4 with the micrometer end surface 97 engaging the end 102 of the extension button 72. The micrometer is rocked gently around the axis of the shank 35 to obtain the highest reading on the needle 41 of dial 42 of the dial indicator assembly 40. The micrometer assembly is held at this reading with the legs 95 firmly held on the exterior surface of the cylindrical sleeve 35 and with end surface 97 engaging the end of post 72. The post is selected so that actuator rod 53 is moved away from its stopped position and the spring 54 is loaded through post 72 and surfaces 71 and 63. The indicator dial is then rotated so that the needle 41 aligns with the zero indication on the dial. This ability to rotate the dial of a dial indicator of course is well known, and the needle 41 does not move while the dial itself is being rotated. After the needle 41 aligns with the zero mark on the dial 42, the micrometer fixture 91 is removed. The number of rotations of the needle 41 caused by the removal of the micrometer fixture is noted and recorded. It should be pointed out that the spring 54 will cause the post 72 to move up because of the sliding action of the surface 63 and the surface 71 as the micrometer is removed.

Then, the screw member 82 from the screw assembly 80 is threaded in, and the plunger 81 acts against the lug 61 and against the force from spring 54 to cause the actuator rod 53 to push on the actuator button 43 and shank 44 of the dial indicator. The screw 82 is turned until the needle 41 has rotated the same number of revolutions that it rotated in opposite direction when the micrometer assembly was removed from sleeve 35. The needle is set with screw 82 so that it is 0.010 inch less than the zero indication on the dial. The indicator is now preset so that when the needle moves to zero again it will indicate the bore size of the bore 27A for the cam shaft bearing housings.

These same steps are desirably followed for setting two separate indicator assemblies 30 and the indicator assemblies are then installed in the hangers 26 as shown in FIG. 1 with the cylindrical sleeves in the bores in hangers 26 and with the indicator posts 72 extending downwardly. The engine head 18 is supported on the parallel bars 17 and adjusted from front to back roughly so that by visual alignment the posts 72 are about in the center of the bores. The sleeve 35 then is slid so that the posts are inside the bores 27A, and the carriage or table 16 is raised until the indicator dial needle 41 is moved to the zero position. If one indicator of one of the assemblies 30 reads higher than the other that means that the surface of the head on the parallel bars is not parallel to the axis of the bores through the housings 27. Where the indicator of an assembly 30 reads higher, there will be more material bored out from the bottom side of the support 27. The cylindrical sleeves 35 are then rotated 90° in the hanger and the head 18 is moved on the parallel bars until the dial indicator readings are again zero with the post on the interior of the end bores 27A. The locks for the head are then snugged down so the head 18 is held securely, but not fixed in position, and the final adjustment up and down can be done by rotating the sleeves 35 and the indicator posts back 90° to the original position, and adjusting the screw 14. Final fore and aft adjustments of the head 18 can be done by tapping the head slightly with a hammer.

In this way the head 18 is easily centered, and when final adjustments are done and all of the clamps are tightened, the indicator assemblies are removed from hangers or arms 26 and the boring bar 100 will be inserted in the hangers 26. As shown in FIG. 5, the micrometer fixture 96 can be used for setting the boring bar tool as well by placing the legs 95 onto the boring bar 100, with the micrometer end surface 97 aligning with a cutting tool 101. The radius of tool 101 can be properly set so that it removes the amount of material necessary. Once the tool 101 has been properly placed into position, then the boring of the bearing seats or housings can proceed in the normal manner.

Although the present invention has been described with reference to preferred embodiments, workers skilled in the art will recognize that changes may be made in form and detail without departing from the spirit and scope of the invention.

What is claimed is:

1. A method of aligning the axes of bores through housings of a part to be bored along a common axis, and using a boring bar supported in at least one hanger having means for rotatably supporting such boring bar and comprising the steps of:

measuring the interior of the bore to be worked upon;
providing an indicator assembly mounted on a substantially cylindrical sleeve having a radially extending post operably coupled to the indicator dial to indicate the amount of extension of the post;

setting the post extension to the desired radius from the center of said cylindrical sleeve;

placing the cylindrical sleeve in the boring bar hanger and with the post inside a bore;

moving the part to be machined in a direction transverse to the sleeve to engage the post and to return the indicator to substantially a zero reading;

rotating the cylindrical sleeve 90° and moving the part to be machined with the post in the same bore until the indicator reaches the desired reading;

fastening the part securely in the machine when centered after the above steps, and inserting a boring bar in the hanger in place of the cylindrical sleeve.

2. The method of claim 1 further comprising the steps of:

providing an adjustable lock to stop movement of the indicator post beyond a desired preset position.

3. The method of claim 1 including the further step of:

providing a pair of hangers for a boring bar, and providing a pair of identical indicator assemblies, one on each of the hangers, and wherein there are a plurality of housings on the part spaced in direction along the axis of boring each house having a bore, with each of the indicators used in a bore of a separate one of the housings to be bored.

* * * * *